(12) United States Patent
Lin et al.

(10) Patent No.: US 9,432,157 B2
(45) Date of Patent: Aug. 30, 2016

(54) ADAPTIVE CONTROL SYSTEM AND METHOD

(71) Applicant: Radiant Opto-Electronics Corporation, Kaohsiung (TW)

(72) Inventors: Jon-Hong Lin, Kaohsiung (TW); Chun-Yi Sun, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 59 days.

(21) Appl. No.: 14/287,354

(22) Filed: May 27, 2014

(65) Prior Publication Data

US 2015/0078400 A1    Mar. 19, 2015

(30) Foreign Application Priority Data

Sep. 13, 2013    (TW) .............................. 102133217 A (51) Int. Cl.
| | | |
|---|---|---|
| *H04W 4/00* | (2009.01) | |
| *H04L 5/00* | (2006.01) | |
| *H04L 27/00* | (2006.01) | |
| *H04L 5/06* | (2006.01) | |
| *H04B 3/54* | (2006.01) | |

(52) U.S. Cl.
CPC ................ *H04L 5/003* (2013.01); *H04L 5/06* (2013.01); *H04L 27/0006* (2013.01); *H04B 3/54* (2013.01)

(58) Field of Classification Search
None
See application file for complete search history.

(56) References Cited

U.S. PATENT DOCUMENTS

| | | | | |
|---|---|---|---|---|
| 7,924,990 B2* | 4/2011 | Koga | ....................... | H04B 3/54 370/482 |
| 2002/0010870 A1* | 1/2002 | Gardner | ................. | H04B 3/542 713/300 |
| 2002/0019214 A1* | 2/2002 | Brown | .................. | H04W 16/14 455/67.11 |
| 2003/0152041 A1 | 8/2003 | Herrmann et al. | | |
| 2006/0146866 A1 | 7/2006 | Horvath et al. | | |
| 2007/0135085 A1* | 6/2007 | Iwamura | ................... | H04B 3/54 455/402 |
| 2010/0296590 A1 | 11/2010 | Takasu | | |

FOREIGN PATENT DOCUMENTS

| | | |
|---|---|---|
| CN | 1799207 A | 7/2006 |
| CN | 102474303 A | 5/2012 |
| CN | 103069723 A | 4/2013 |
| CN | 103166677 A | 6/2013 |
| JP | 2009-021678 A | 1/2009 |
| WO | 03/090037 A2 | 10/2003 |

OTHER PUBLICATIONS

Search Report dated Mar. 9, 2015, issued by the State Intellectual Property Office of the People's Republic of China in corresponding Chinese Patent Application No. CN-2013105221294, with partial English translation (4 pages).

(Continued)

*Primary Examiner* — Kwang B Yao
*Assistant Examiner* — Juvena Loo
(74) *Attorney, Agent, or Firm* — Osha Liang LLP (57) ABSTRACT

An adaptive control system includes a plurality of coupling circuits. Each of the coupling circuits is adapted to connect electrically a respective one of the electronic devices to the multi-carrier channel, and is operable to search for an idle frequency band of a multi-carrier channel and to enable the respective one of the electronic devices to communicate with a corresponding one of the electronic devices via the idle frequency band of the multi-carrier channel.

10 Claims, 5 Drawing Sheets

(56) References Cited

OTHER PUBLICATIONS

European Search Report dated Jan. 20, 2015, issued by The Hague in corresponding European Patent Application No. EP-14184486 (10 pages).
Yan, Zhao, et al., "A Smart Platform with Cognitive techniques for Narrowband Power Line Communication"; SOC Design conference (ISOCC), 2012 International, IEEE, Nov. 4, 2012; XP032301922, DOE: 10.1109/ISOCC.2012.6407100, ISBN: 978-1-4673-2989-7; pp. 301-304.
Biagi, Mauro, et. al., "Cognitive Spectrum Shaping for InHome Power Line Communications"; 2012 16th IEEE International Symposium on Power Line Commications and Its Applications; Mar. 27, 2012; XP032181537, DOI: 10.1109/ISPLC.2012.6201345, ISBN: 978-1-4673-0359-0; pp. 35-40.
Oh, Ser Wah, et al., "Cognitive Power Line Communication System for Multiple Channel Access"; IEEE International Symposium on Power Line Communications and Its Applications, Piscataway, NJ, U.S., Mar. 29, 2009; XP031453659, ISBN: 978-1-4244-390-0; pp. 47-52.

* cited by examiner

ADAPTIVE CONTROL SYSTEM AND METHOD

CROSS-REFERENCE TO RELATED APPLICATION

This application claims priority of Taiwanese Application No. 102133217, filed on Sep. 13, 2013.

BACKGROUND OF THE INVENTION

1. Field of the Invention

The present invention relates to a method and system of adaptive control.

2. Description of the Related Art

A conventional light emitting apparatus is operative generally by connecting electrically a main circuit board thereof to a control circuit of a switch. When one or more light emitting apparatuses are to be controlled by a plurality of switches, each of the switches requires electrical connection to at least a corresponding one of the light emitting apparatuses that is to be controlled thereby. In some particular situations, cables used to transmit electric power should be further distinguished and separated from cables used to transmit control signals. That is to say, the more the switches and the light emitting apparatuses are, the more complicated the configuration of the cables would be. As a result, it may require additional time for installing the light emitting apparatuses and for wiring the cables, and it is difficult to repair the light emitting apparatuses. Moreover, when an additional light emitting apparatus is required, besides complicated installation thereof, a considerable amount of cables may be wasted.

To solve the abovementioned problem, power line carrier (PLC) has been developed and employed to simultaneously transmit/receive electric power, control signals and data among electronic devices via a multi-carrier channel, such that an amount of the cables used in a light emitting system including a plurality of the light emitting apparatus may be decreased. However, since all the signals and data are transmitted via the same multi-carrier channel, in order to operate correctly and smoothly the light emitting system, communication protocols among the electronic devices and designs of circuits for coupling the electronic devices become relatively complicated, thereby causing additional cost and repairing fee of the light emitting system. Furthermore, if different electronic devices are to be added into the light emitting system, current usage and setting of the multi-carrier channel should be fully comprehended in advance so as to allocate frequency bands thereof and to correspondingly adjust communication protocol for the electronic devices that are to be added, thereby resulting in inconvenience on installation and expansion of the light emitting system.

SUMMARY OF THE INVENTION

Therefore, an object of the present invention is to provide an adaptive control system capable of alleviating the above mentioned drawbacks of the prior art.

Accordingly, an adaptive control system of the present invention is for operatively communicating a plurality of electronic devices through a multi-carrier channel that has a plurality of frequency bands.

The adaptive control system includes a plurality of coupling circuits. Each of the coupling circuits is adapted to connect electrically a respective one of the electronic devices to the multi-carrier channel, and is operable to search for an idle one of the frequency bands of the multi-carrier channel and to enable the respective one of the electronic devices to communicate with a corresponding one of the electronic devices via the idle one of the frequency bands of the multi-carrier channel.

Another object of the present invention is to provide an adaptive control method capable of alleviating the above mentioned drawbacks of the prior art.

According to another aspect, an adaptive control method of the present invention is for operatively communicating a controlling device and a controlled device through a multi-carrier channel that has a plurality of frequency bands. The method is implemented using a coupling circuit which connects electrically the controlling device to the multi-carrier channel.

The method includes the following steps of:

(a) searching, by the coupling circuit, for signals in the multi-carrier channel under one of the frequency bands;

(b) determining, by the coupling circuit, whether one of the signals in step (a) is a noise;

(c) using the coupling circuit, determining that the frequency band found in step (a) is an idle frequency band when the determination made in step (b) is affirmative, and repeating steps (a) and (b) with another one of the frequency bands when otherwise;

(d) using the coupling circuit, receiving a control signal from the controlling device and transmitting a signal associated with the control signal to the controlled device through the multi-carrier channel under the idle frequency band determined in step (c); and (e) enabling, by the coupling circuit, the controlling device to operatively communicate with the controlled device in response to receipt of a confirmation signal from the controlled device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Before the present invention is described in greater detail, it should be noted that like elements are denoted by the same reference numerals throughout the disclosure.

Figure 1:
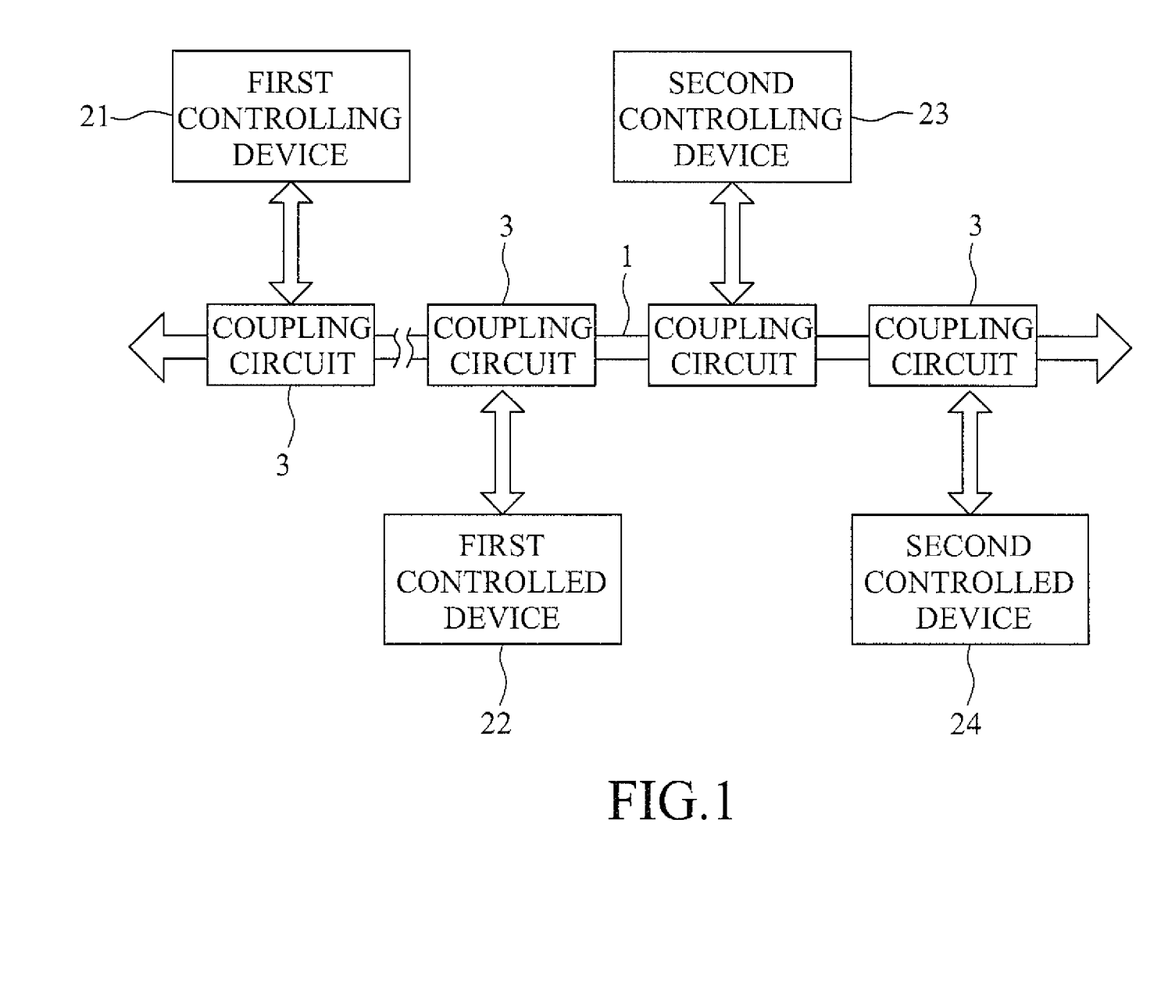
FIG. 1 is a schematic block diagram of an adaptive control system according to a preferred embodiment of the present invention.
Figure 2:
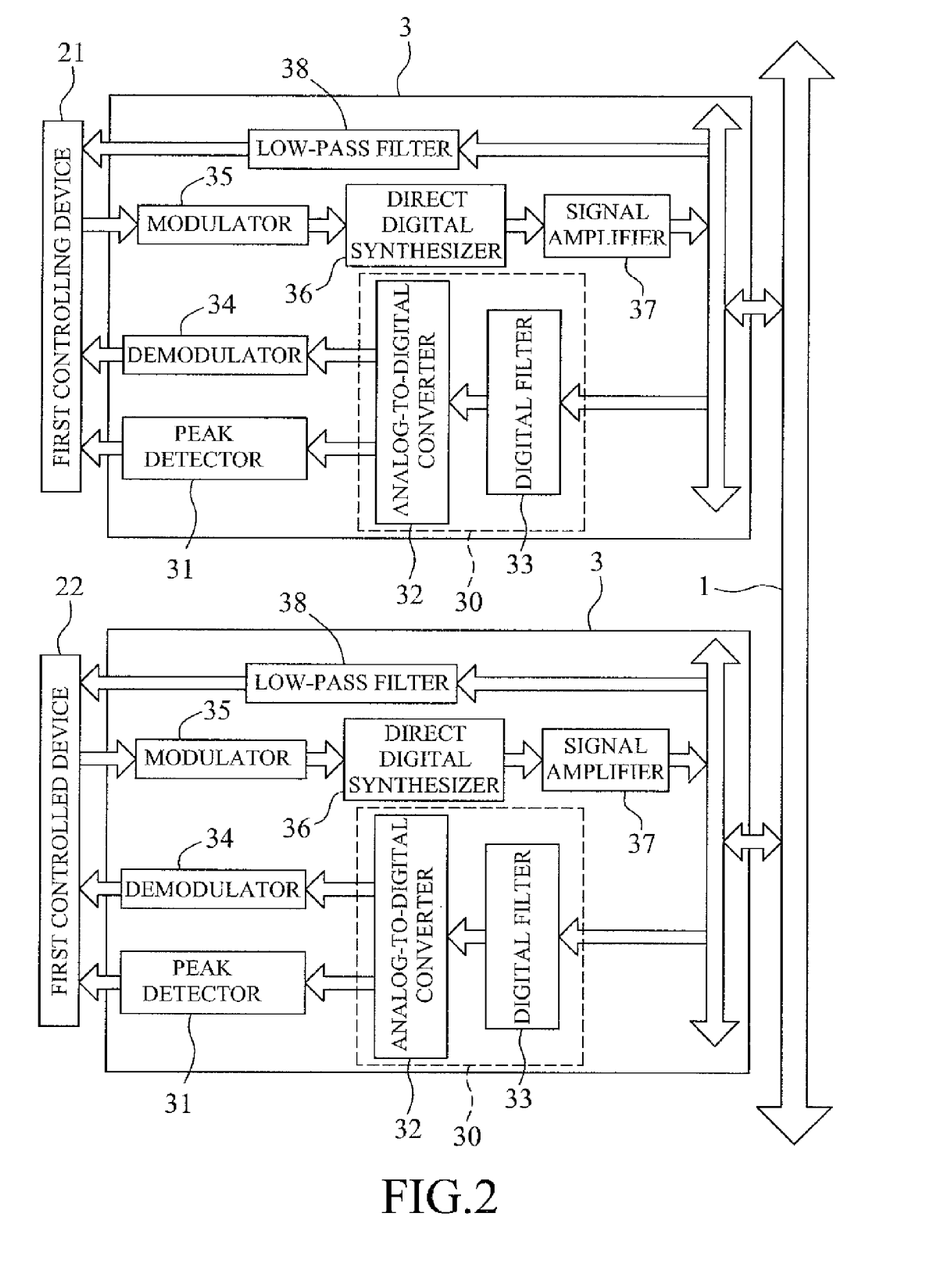
FIG. 2 is a block diagram illustrating coupling circuits of the adaptive control system of FIG. 1 according to the preferred embodiment.

Referring to FIGS. 1 and 2, an adaptive control system according to a preferred embodiment of the present invention is configured to implement an adaptive control method for operatively communicating a plurality of electronic devices 21-24 through a multi-carrier channel 1 having a plurality of frequency bands. The adaptive control system includes a plurality of coupling circuits 3. Each of the coupling circuits 3 is adapted to connect electrically a respective one of the electronic devices 21-24 to the multi-carrier channel 1. Each of the coupling circuits 3 includes a filter unit 30 connected electrically to the multi-carrier channel 1, a peak detector 31 and a demodulator 34 connected electrically to the filter unit 30, a modulator 35, a direct digital synthesizer (DDS) 36 connected electrically to the modulator 35, a signal amplifier 37 connected electrically to the direct digital synthesizer 36, and a low-pass filter 38. The low-pass filter 38 is connected electrically between the multi carrier channel 1 and the respective one of the electronic devices 21-24 for passages of low-frequency signals and for transmission of electric power into the respective one of the electronic devices 21-24. The respective one of the electronic devices 21-24 is further connected electrically to the peak detector 31, the demodulator 34 and the modulator 35.

Figure 3:
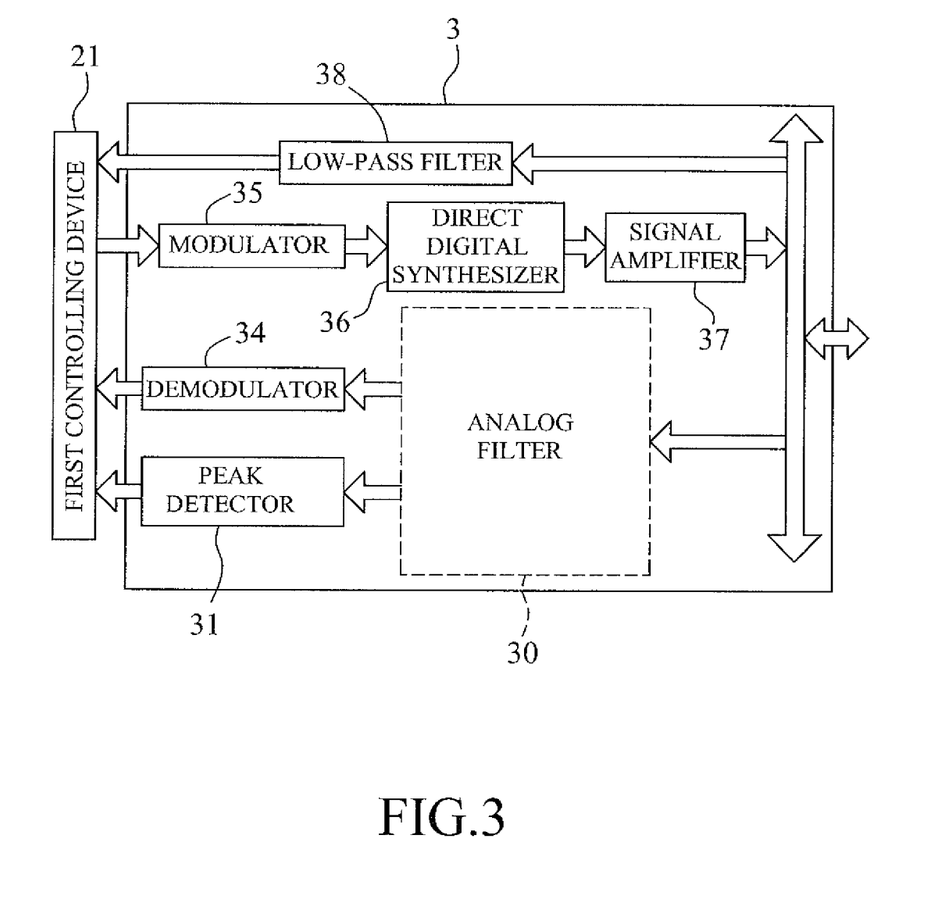
FIG. 3 is a block diagram of another example of the coupling circuit according to the preferred embodiment.

In this preferred embodiment, the filter unit 30 of each of the coupling circuits 3 includes a digital filter 32 and an analog-to-digital converter 33. Alternatively, the filter unit 30 may be an analog filter (as shown in FIG. 3) such that an analog signal received from the multi-carrier channel 1 may be directly processed by the analog filter and the analog-to-digital converter 33 may thus be omitted. In addition, the adaptive control system illustrated herein is applied to a light emitting system as an example. Furthermore, the electronic devices 21, 22, 23, 24 illustrated in this example include first and second controlling devices 21, 23 (e.g., switches or master devices), and first and second controlled devices 22, 24 (e.g., lamps or slave devices). The first and second controlled devices 22, 24 are controlled respectively by the first and second controlling devices 21, 23.

In actual implementation, electric power outputted by a power source (not shown) is transmitted to the electronic devices 21-24 via the multi-carrier channel 1. Generally, the power source outputs the electric power of either alternating current (AC) or direct current (DC) with a frequency of about 400 Hz. The low-pass filter 38 of the coupling circuit 3 is configured to allow the electric power (i.e., the low-frequency signal) from the multi-carrier channel 1 to pass therethrough, such that the electric power may be transmitted to the respective one of the electronic devices 21-24 for operation.

When a user uses the first controlling device 21 to turn on/off the first controlled device 22 or perform other operation of the first controlled device 22, the filter unit 30 and the peak detector 31 of a corresponding one of the coupling circuits 3 connected electrically to the first controlling device 21 will cooperatively search for an idle one of the frequency bands in the multi-carrier channel 1 that is yet to be occupied (detailed description of a procedure for searching for an idle frequency band will be further demonstrated in the following). After the idle frequency band is found, the modulator 35 modulates a control signal received from the first controlling device 21 into a modulated signal. Subsequently, the direct digital synthesizer 36 generates a synthesized signal from the modulated signal that is received from the modulator 35. Afterwards, the signal amplifier 37 amplifies the synthesized signal received from the direct digital synthesizer 36 to result in an amplified signal, and transmits the amplified signal to the multi-carrier channel 1 via the idle frequency band.

As for the corresponding one of the coupling circuits 3 connected electrically to the first controlled device 22, the analog-to-digital converter 33 of the filter unit 30 receives, from the multi-carrier channel 1 the amplified signal in an analog form, and digitizes the amplified signal into a digital signal. Then, the digital filter 32 of the filter unit 30 performs digital filtering on the digital signal received from the analog-to-digital converter 33, and outputs a filtered signal to the demodulator 34. Ultimately, the demodulator 34 demodulates the filtered signal to result in an operation signal that is associated with the control signal and that enables the first controlled device 22 to perform relevant operation.

Figure 4:
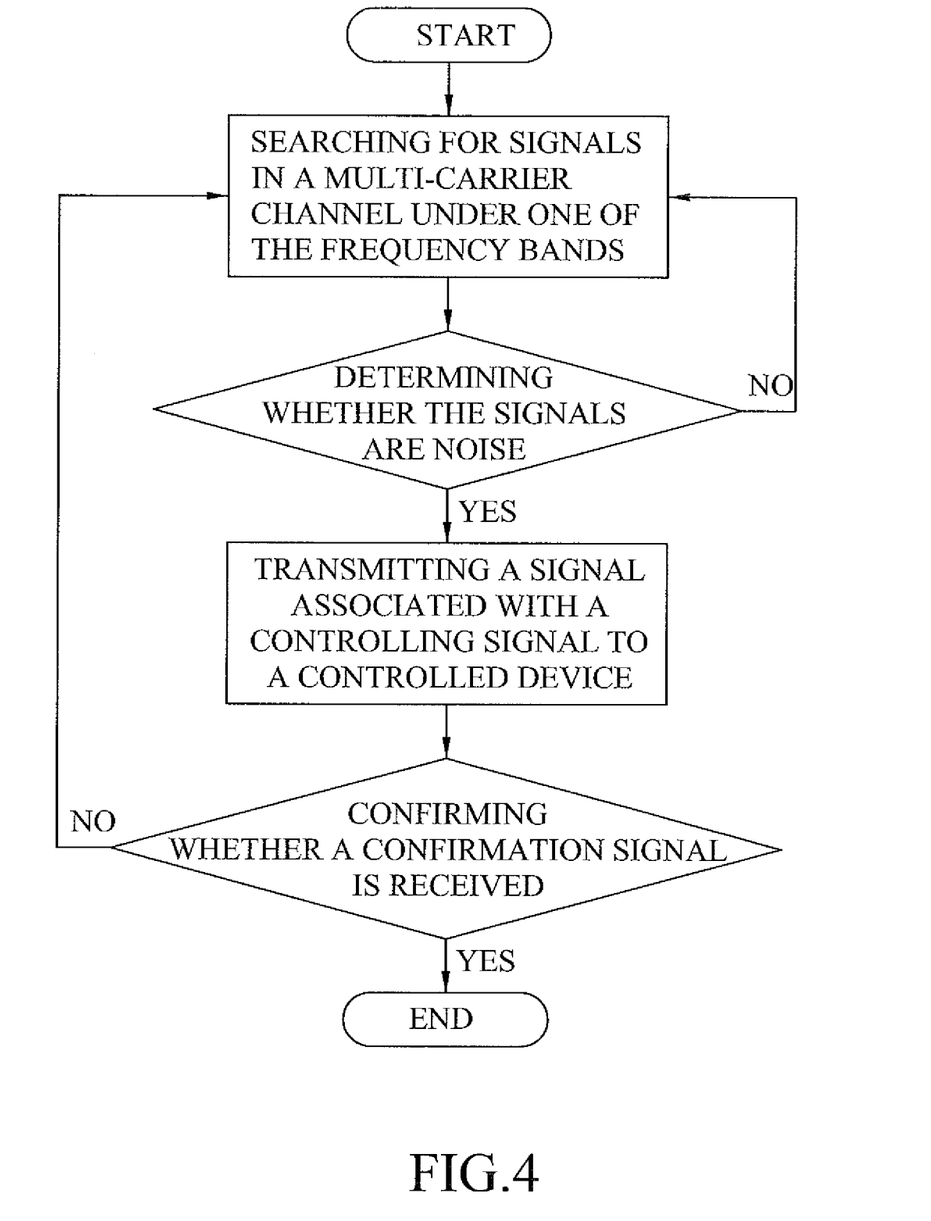
FIG. 4 is a flow chart of an adaptive control method according to the preferred embodiment.

Referring further to FIG. 4, in the method of adaptive control, the digital filter 32 of the filter unit 30 in this preferred embodiment is operable, in step S1, to set up one of the frequency bands (e.g., 10 kHz~20 kHz) of the multi-carrier channel 1 by band-pass filtering process and to search and pass all frequency signals within the frequency band. In step S2, the peak detector 31 is operable to determine whether the frequency signals are noise. If it is determined in step S2 that the frequency signals are noise, the frequency band set up by the digital filter 32 in step S1 will be defined as the idle frequency band. On the other hand, if it is determined in step S2 that the frequency signals are valid signals, the frequency band set up in step S1 is considered as being occupied, and the digital filter 32 will repeat step S1 by setting up another one of the frequency bands.

For example, in the case that the frequency signals are binary digital signals, the peak detector 31 is configured to determine whether the frequency signals are noise by determining if first two digits of most significant bit (MSB) of each of the binary digital signals are zero. If the first two digits of the MSB are zero, which means the binary digital signal is a noise, the frequency band set up by the digital filter 32 in step S1 will thus be defined as the idle frequency band. If either of the first two digits of the MSB is not zero, which means the binary digital signal is a valid signal (not noise), the current frequency band is considered as being occupied, and the digital filter 32 will repeat step S1 to set up another frequency band (e.g., 20 kHz~30 kHz) and to search and pass all frequency signals within the frequency band thus set.

It is understood that energy detection of the signal may be applied as an alternative means to decide whether one of the frequency bands is idle in other preferred embodiments of the present invention. For example, when it is detected that the amplified signal to be transmitted to the multi-carrier channel 1 has energy significantly greater than average energy of the frequency signals received under the frequency band set up in step S1 (or when it is detected that the average energy of the frequency signals is below a predetermined value), the frequency band is defined as the idle frequency band. It is further understood that step S1 of setting up the frequency band and step S2 of determining whether the frequency signals are noise may be adapted according to actual situations and should not be limited to this preferred embodiment.

After the idle frequency band is found in step S2, the coupling circuit 3 is then operable to execute step S3 in response to receipt of the control signal from the first controlling device 21.

In step S3, the coupling circuit 3 that is connected electrically to the first controlling device 21 is operable to process the control signal into the amplified signal and to transmit the amplified signal to a corresponding one of the coupling circuits 3 that is connected electrically to the first controlled devices 22 via the multi-carrier channel 1 under the idle frequency band.

Figure 5:
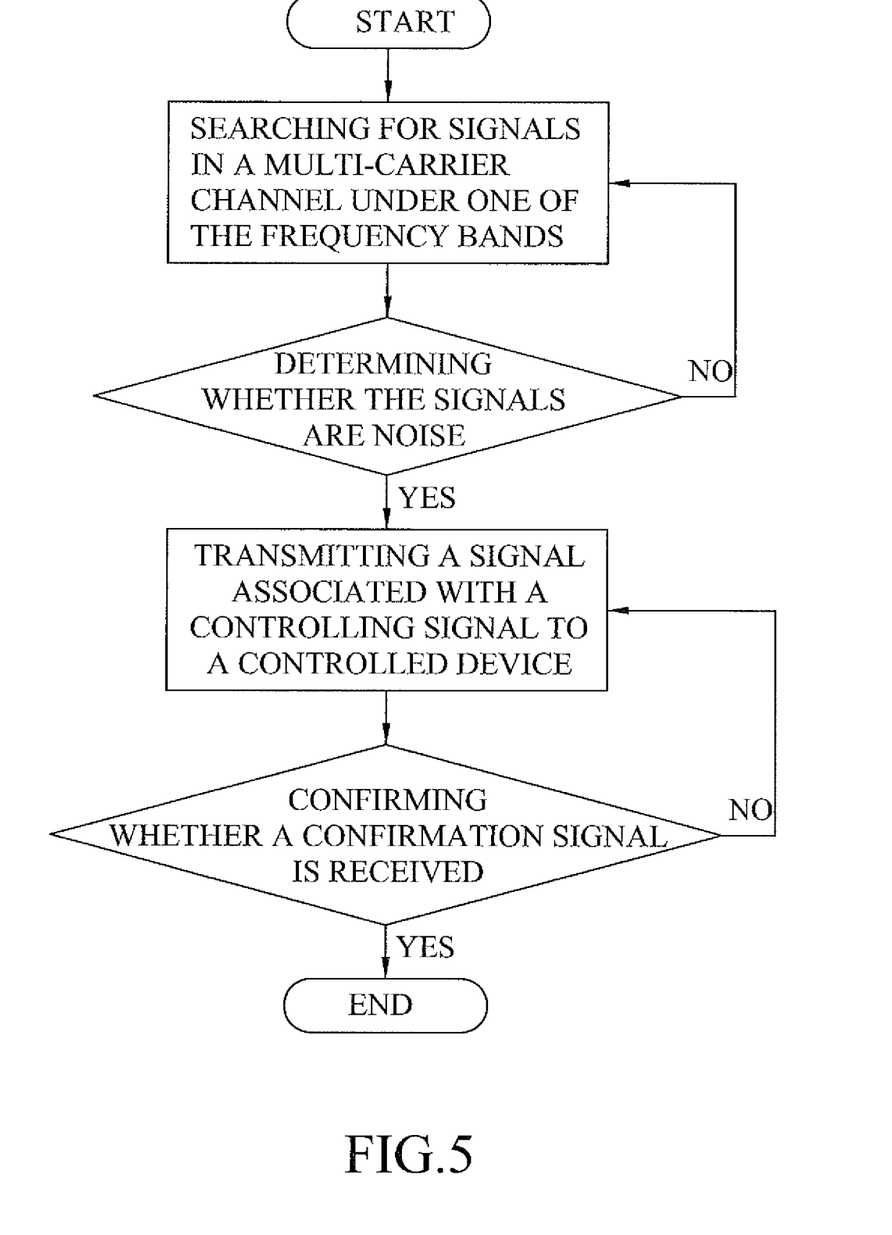
FIG. 5 is a flow chart of another example of the adaptive control method according to the preferred embodiment.

After receiving the amplified signal, the coupling circuit 3 connected electrically to the first controlled device 22 is operable to process the amplified signal into the operation signal for the first controlled device 22 to perform relevant operation, and the first controlled device 22 may transmit a confirmation signal back to the coupling circuit 3 that is connected electrically to the first controlling device 21. In response to receipt of the conformation signal from the first controlled device 22, the coupling circuit 3 connected electrically to the first controlling device 21 enables the first controlling device 21 to operatively communicate with the first controlled device 22. On the other hand, when the coupling circuit 3 connected electrically to the first controlling device 21 fails to receive the confirmation signal from the first controlled device 22, the coupling circuit 3 is operable to repeat steps S1 to S3 with another one of the frequency bands. Alternatively, as shown in FIG. 5, the coupling circuit 3 may be configured to only repeat step S3 to re-transmit the amplified signal associated with the control signal from the first controlling device 21.

By virtue of the adaptive control system and method according to the present invention, an idle one of the frequency bands that is yet to be occupied may be effectively and automatically found in the multi-carrier channel 1 as a communication channel between two of the electronic devices 21-24. Moreover, if a new electronic device (not shown) is to be added, another idle one of the frequency bands for signal transmission to the new electronic device may be effectively and automatically found in the multi-carrier channel 1. Thus, additional time to comprehend the current conditions of the multi-carrier channel 1 as well as to re-allocate the frequency bands of the multi-carrier channel 1 are not required, thereby improving convenience on installation of a new electronic device.

In addition, various types of electronic devices adopting the adaptive control system of the present invention may be easily integrated by the multi-carrier channel 1, and operative communication between two electronic devices may be easily achieved. Furthermore, using the idle frequency band of the multi-carrier channel 1 and signal encoding/decoding techniques may independently transmit signals between two electronic devices, alleviating signal interference.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An adaptive control system for operatively communicating a plurality of electronic devices through a multi-carrier channel having a plurality of frequency bands, at least one of the plurality of electronic devices communicating with at least another one of the plurality of electronic devices via an idle frequency band among the plurality of frequency bands, and said adaptive control system comprising:
   a plurality of coupling circuits adapted to connect electrically the plurality of electronic devices to the multi-carrier channel,
   wherein each of the plurality of coupling circuits includes a peak detector that is adapted to be connected electrically to the multi-carrier channel, and that is operable to determine the idle frequency band based on whether binary digital signals transmitted within the plurality of frequency bands are noise by determining if first two digits of most significant bit of each of the binary digital signals are zero.

2. The adaptive control system as claimed in claim 1, wherein each of the plurality of coupling circuits further includes a filter unit connected electrically to the peak detector and adapted to be connected electrically to the multi-carrier channel.

3. The adaptive control system as claimed in claim 2, wherein the filter unit of each of the plurality of coupling circuits includes:
   an analog-to-digital converter adapted to be connected electrically to the multi-carrier channel for receiving an analog signal from the multi-carrier channel under one of the plurality of frequency bands, and being operable to digitize the analog signal into a digital signal; and
   a digital filter connected electrically between the analog-to-digital converter and the peak detector, and being operable to perform digital filtering on the digital signal received from the analog-to-digital converter, and to output a filtered signal to the peak detector, which is subsequently operable to search for the idle frequency band according to the filtered signal.

4. The adaptive control system as claimed in claim 2, wherein the filter unit of each of the plurality of coupling circuits is an analog filter.

5. The adaptive control system as claimed in claim 1, the plurality of electronic devices including a plurality of controlling devices, wherein the adaptive control system comprises a first group of the plurality of coupling circuits, each of the plurality of coupling circuits in the first group connecting electrically a respective one of the plurality of controlling devices to the multi-carrier channel, and further including:
   a modulator adapted to be connected electrically to a respective one of the plurality of controlling devices for modulating a control signal received therefrom into a modulated signal;
   a direct digital synthesizer connected electrically to said modulator for generating a synthesized signal from the modulated signal received therefrom; and
   a signal amplifier connected electrically to said direct digital synthesizer for amplifying the synthesized signal received therefrom to result in an amplified signal and for transmitting the amplified signal to the multi-carrier channel under the idle frequency band among the plurality of frequency bands.

6. The adaptive control system as claimed in claim 5, the plurality of electronic devices further including a plurality of controlled devices, wherein the adaptive control system further comprises a second group of the plurality of coupling circuits, each of the plurality of coupling circuits in the second group connecting electrically a respective one of the plurality of controlled devices to the multi-carrier channel, and further including:
   a filter unit adapted to be connected electrically to the multi-carrier channel for receiving and filtering the amplified signal therefrom; and
   a demodulator connected electrically to the filter unit, adapted to be connected electrically to a respective one of the plurality of controlled devices, and being operable to demodulate the amplified signal that is filtered by and is received from the filter unit to result in an operation signal that is associated with the control signal and that enables the respective one of the plurality of controlled devices to perform relevant operation.

7. The adaptive control system as claimed in claim 1, wherein each of the plurality of coupling circuits includes a low-pass filter that is adapted to be connected electrically between the multi-carrier channel and the respective one of the plurality of electronic devices.

8. An adaptive control method for operatively communicating a controlling device and a controlled device through a multi-carrier channel having a plurality of frequency bands, said method to be implemented using a coupling circuit which connects electrically the controlling device to the multi-carrier channel, said method comprising the following steps of:
   (a) searching, by the coupling circuit, for binary digital signals in the multi-carrier channel under one of the plurality of frequency bands;
   (b) determining, by a peak detector of the coupling circuit, whether the signals are noise by determining if first two digits of most significant bit of each of the binary digital signals are zero;
   (c) using the coupling circuit, determining that said one of the plurality of frequency bands is an idle frequency band when the determination made in step (b) is affirmative, and repeating steps (a) and (b) with another one of the plurality of frequency bands when otherwise;
   (d) using the coupling circuit, receiving a control signal from the controlling device and transmitting a signal associated with the control signal to the controlled device through the multi-carrier channel under the idle frequency band determined in step (c); and
   (e) enabling, by the coupling circuit, the controlling device to operatively communicate with the controlled device in response to receipt of a confirmation signal from the controlled device.

9. The adaptive control method as claimed in claim 8, further comprising the steps of repeating steps (a) to (c) with another one of the plurality of frequency bands and re-transmitting the signal associated with the control signal received in step (d) when the coupling circuit fails to receive the confirmation signal.

10. The adaptive control method as claimed in claim 8, further comprising the step of re-transmitting the signal associated with the control signal received in step (e) when the coupling circuit fails to receive the confirmation signal.

* * * * *